United States Patent
Fung et al.

(10) Patent No.: US 8,569,442 B2
(45) Date of Patent: Oct. 29, 2013

(54) HYDROGENATION PROCESS FOR IMPROVING YIELD OF HYDROGENATED BISPHENOL-A-BASED EPOXY RESIN

(75) Inventors: Dein-Run Fung, Taipei (TW); Jung-Jen Chuang, Taipei (TW); Chia-Ruey Tsai, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 346 days.

(21) Appl. No.: 13/023,610

(22) Filed: Feb. 9, 2011

(65) Prior Publication Data

US 2012/0101238 A1   Apr. 26, 2012

(30) Foreign Application Priority Data

Oct. 25, 2010   (TW) ............................... 99136271 A

(51) Int. Cl.
C08G 59/06   (2006.01)
C08G 59/14   (2006.01)
C07D 303/04   (2006.01)

(52) U.S. Cl.
USPC ............................................ 528/92; 549/545

(58) Field of Classification Search
None
See application file for complete search history.

(56) References Cited

U.S. PATENT DOCUMENTS

| | | | | |
|---|---|---|---|---|
| 5,053,551 A | * | 10/1991 | Harrison et al. | 568/454 |
| 6,060,611 A | * | 5/2000 | Hara et al. | 549/540 |
| 7,232,877 B2 | * | 6/2007 | Figovsky et al. | 528/196 |
| 2002/0110508 A1 | * | 8/2002 | Campo et al. | 423/138 |
| 2002/0114760 A1 | * | 8/2002 | Corbeil et al. | 423/562 |
| 2004/0134794 A1 | * | 7/2004 | Sundaram et al. | 205/688 |
| 2006/0194063 A1 | * | 8/2006 | Murai et al. | 428/413 |

FOREIGN PATENT DOCUMENTS

JP   2000-226380 A   *   8/2000

* cited by examiner

Primary Examiner — Robert Sellers
(74) Attorney, Agent, or Firm — Bacon & Thomas, PLLC

(57) ABSTRACT

A hydrogenation process for hydrogenating bisphenol-A-based epoxy resin under low-temperature, low-pressure conditions includes using a hydrogenation reactor that has a gas-distributing agitator functional to introduce and exhaust hydrogen gas and stir liquid reactant, so that hydrogen gas introduced into the hydrogenation reactor can be evenly distributed into a liquid reactant placed into the hydrogenation reactor to make the liquid reactant contain a high level of dissolved hydrogen, which not only enhances activity of an involved hydrogenation catalyst and accelerates hydrogenation reaction, but also allows hydrogenation reaction to be performed in a low-temperature, low-pressure environment. The hydrogenation process improve yield of the hydrogenated bisphenol-A-based epoxy resin to 99.0-99.9%, while significantly reducing building and maintaining costs for the hydrogenation reactor, thus being an economic process.

3 Claims, 2 Drawing Sheets

HYDROGENATION PROCESS FOR IMPROVING YIELD OF HYDROGENATED BISPHENOL-A-BASED EPOXY RESIN

BACKGROUND OF THE PRESENT INVENTION

1. Field of the Invention

The present invention relates to manufacturing of hydrogenated bisphenol-A-based epoxy resin, and more particularly, to a hydrogenation process that is performed under low-temperature, low-pressure conditions and facilitates improvement of yield of hydrogenated bisphenol-A-based epoxy resin.

2. Description of Prior Art

Bisphenol-A-based epoxy resin is one of the mot extensively used epoxy resins. Especially, hydrogenated bisphenol-A-based epoxy resin processed by hydrogenation does not contain double bonds and is unlikely to yellow, while having low viscosity, excellent processability and outstanding weatherability.

As shown in FIG. 1, a traditional hydrogenation reactor 10 for hydrogenating BPA-based epoxy resin has a vane stirrer 20, whose shaft 21 drives blades 22 at its terminal to stir a solution of bisphenol-A-based epoxy resin (hereinafter referred to as the liquid reactant) 30. High-pressure hydrogen gas is introduced through a hydrogen gas duct leading to the liquid reactant 30. The high pressure is applied to force contact between the hydrogen gas and the liquid reactant 30, so that the liquid reactant 30 performs desired hydrogenation reaction with the hydrogen gas in the presence of catalysts and produces hydrogenated bisphenol-A-based epoxy resin.

The conventional hydrogenation reactor 10 is less effective to contact the hydrogen gas with the liquid reactant 30, and consequently results in lower yield of hydrogenated bisphenol-A-based epoxy resin as a product of the hydrogenation reaction. For better yield, one approach is to make the hydrogenation reactor 10 as one providing a high-pressure reaction environment, yet this approach is costly and unfavorable to industrial production.

Among known skills in the art, U.S. Pat. No. 6,130,344 has disclosed a process for producing compound having epoxy group, which involves subjecting a compound having at a carbon-carbon unsaturated bond and an epoxy group to selective hydrogenation in the presence of a catalyst comprising rhodium or ruthenium at a reaction temperature of 30-150° C. under a reaction pressure of 1-30 MPa. This known technology has the following shortcomings:

1. Resulting high consumption of hydrogen gas, up to 30 MPa or 4351 lb/in$^2$;
2. For acceptable reaction rate, requiring high reaction temperature, up to 150° C., which can make epoxy group decomposed; and
3. Requiring special equipment for dealing with high-pressure, high-temperature operation.

On the other hand, U.S. Pat. No. 6,060,611 has disclosed an aromatic epoxy resin that is made through hydrogenation under the conditions similar to those adopted in 006130344A Patent, namely a reaction temperature of 30-150° C. and a reaction pressure of 1-30 MPa, thus having the same shortcomings as happening to the above-mentioned U.S. Pat. No. 6,130,344, while suffering from a relatively low yield.

SUMMARY OF THE INVENTION

For getting out of the rut that manufacturing hydrogenated bisphenol-A-based epoxy resin requires a high-temperature, high-pressure environment, the present invention provides a hydrogenation process for hydrogenating bisphenol-A-based epoxy resin under a low-temperature, low-pressure environment, wherein the process helps to improve the yield of the resultant hydrogenated bisphenol-A-based epoxy resin to 99.0-99.9%.

The hydrogenation process of the present invention comprises steps of:

a) providing a hydrogenation reactor internally equipped with a gas-distributing agitator which has a hollow shaft thereof and blades at a terminal of the hollow shaft as well as has functions of introducing and exhausting hydrogen gas and stirring liquid reactant if started;

b) introducing a liquid reactant containing bisphenol-A-based epoxy resin prepared in a solvent into the hydrogenation reactor;

c) adding a hydrogenation catalyst into the liquid reactant, wherein a use amount of the bisphenol-A-based epoxy resin ranges between 0.2 and 15 wt %;

d) introducing hydrogen gas having a pressure ranging between 140 and 1000 lb/in2;

e) activating the gas-distributing agitator rotated in a predetermined rotation rate to have the hydrogen gas drawn into the hollow shaft of the gas-distributing agitator through gas inlets formed on the hollow shaft and located above a liquid surface of the liquid reactant, and further have the drawn hydrogen gas exhausted out through gas outlets formed on the hollow shaft and immersed in the liquid reactant, thereby the rotating blades of the gas-distributing agitator evenly distributing the exhausted hydrogen gas over the liquid reactant;

f) performing hydrogenation reaction at a reaction temperature ranging between 30 and 90° C. for a reaction time ranging between 1 and 18 hours, so that the bisphenol-A-based epoxy resin in the liquid reactant is hydrogenated and form hydrogenated bisphenol-A-based epoxy resin; and g) at completion of the hydrogenation reaction, cooling the liquid reactant to the room temperature, filtering out the catalyst and removing the solvent to obtain the hydrogenated bisphenol-A-based epoxy resin.

By implementing the hydrogenation reactor with the gas-distributing agitator functional to extract and exhaust gas and stir, the following purposes can be achieved by the present invention:

1. Improving contact between the hydrogen gas and the liquid reactant;
2. Endowing the liquid reactant to be hydrogenated with a high level of dissolved hydrogen, which enhances activity of the catalyst and accelerates hydrogenation reaction; and
3. Allowing the hydrogenation process to be performed in a low-temperature, low-pressure environment so as to significantly reduce building and maintaining costs for the hydrogenation reactor, while improving yield of the hydrogenated bisphenol-A-based epoxy resin, thus realizing an economic process.

DETAILED DESCRIPTION OF THE PREFERRED EMBODIMENTS

Figure 1:
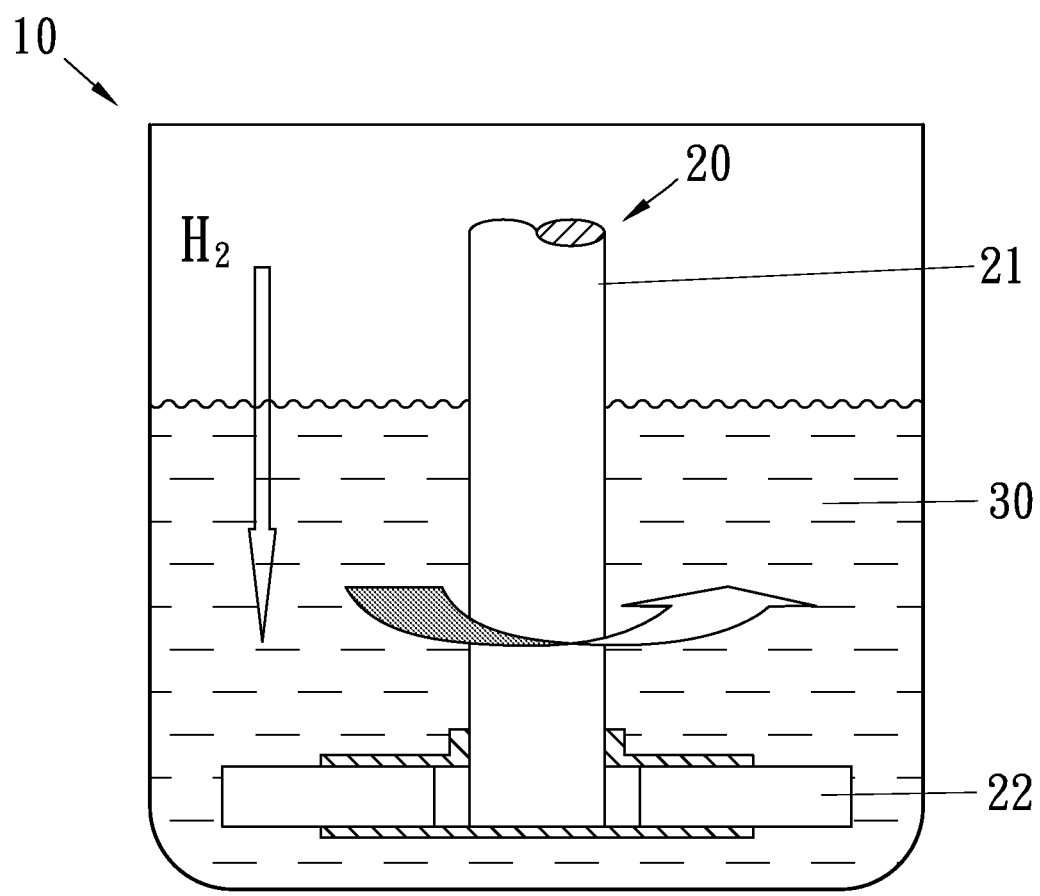
FIG. 1 shows a traditional hydrogenation reactor for making hydrogenated bisphenol-A-based epoxy resin.
Figure 2:
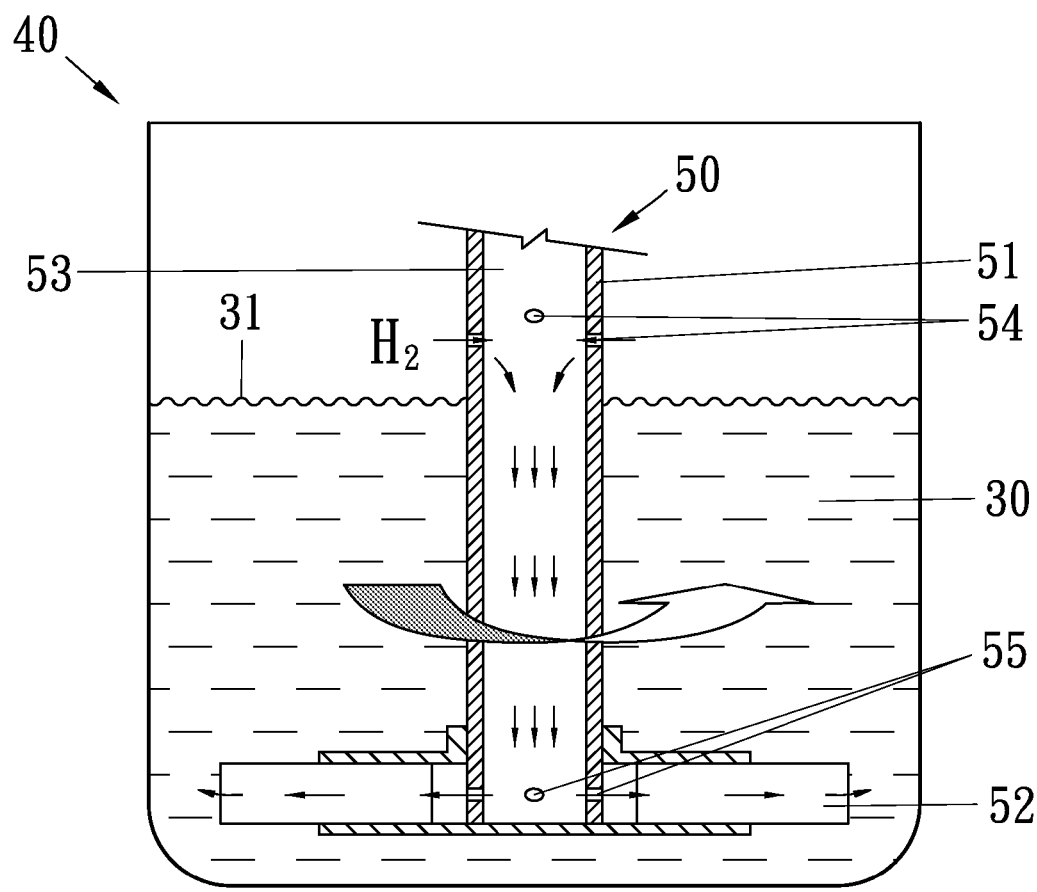
FIG. 2 illustrates a hydrogenation reactor according to the present invention.

As shown in FIG. 2, a hydrogenation reactor 40 of the present invention for hydrogenating bisphenol-A-based epoxy resin has a gas-distributing agitator 50 equipped inside, the gas-distributing agitator 50 has functions of introducing and exhausting hydrogen gas and stirring liquid reactant to improve the higher efficiency of hydrogen gas adequately contacted with a liquid reactant 30 placed and reacted into the hydrogenation reactor 40, so as to not only allow hydrogenation reaction of bisphenol-A-based epoxy resin under relatively low pressure and low temperature, but also increase yield of the hydrogenated bisphenol-A-based epoxy resin.

The gas-distributing agitator 50 comprises a hollow shaft 51 and blades 52 located at a terminal of the hollow shaft 51. The hollow shaft 51 is formed therein with a gas channel 53 for running hydrogen gas. The hollow shaft 51 has its upper part formed with a plurality of gas inlets 54 that are communicated with the gas channel 53. In use, the gas inlets 54 are positioned above a liquid surface 31 of the resin solution 30, so as to allow hydrogen gas to be drawn or introduced and guided into the gas channel 53. The hollow shaft 51 has its lower part formed with a plurality of gas outlets 55 that are also communicated with the gas channel 53, for allowing the hydrogen gas entering the gas channel 53 to be exhausted through the gas outlets 54.

The blades 52 of the gas-distributing agitator 50 may be shaped to be planar, curved or concave.

The hydrogenation reactor 40 of the present invention may be a column-shaped pressure container, with a ratio between its height and diameter preferably between 0.4 and 3. In addition to the gas-distributing agitator 50, the hydrogenation reactor 40 may be further equipped with a heat exchange plate or a cooling coil for timely removing heat generated in the course of hydrogenation reaction and preventing heat accumulation. Meanwhile, according to the present invention, hydrogenation of bisphenol-A-based epoxy resin may be performed in a batch manner, a semi-batch manner or a continuous manner.

For hydrogenating bisphenol-A-based epoxy resin, the catalyst adopted is a heterogeneous catalyst, which may contain ruthenium, palladium, platinum, rhodium or nickel. With consideration to hydrogenation speed and costs, the preferred use amount of the hydrogenation catalyst according to the present invention is 0.2-15.0 wt % by weight of the bisphenol-A-based epoxy resin, or more preferably is 0.5-5.0 wt %.

For diluting the bisphenol-A-based epoxy resin into the liquid reactant, a solvent adopted may be methylbenzene, methyl isobutyl ketone or tetrahydrofuran, as long as the solvent does not degrade the activity of the catalyst and has stable viscosity that brings about no impact on the level of hydrogenation. The solvent is selected such that it does not react with the bisphenol-A-based epoxy resin to produce any by-product. The use amount of the solvent for dilution ranges between 1 and 3 times, so as to accelerate hydrogenation.

According to the present invention, the hydrogenation reactor 40 equipped with the gas-distributing agitator 50 and the heat exchange plate or the cooling coil is effective to improve the yield of hydrogenated bisphenol-A-based epoxy resin because contact between the hydrogen gas and the liquid reactant in the hydrogenation reactor 40 is improved and heat generated by the hydrogenation reaction can be timely dissipated, so that the hydrogenation reaction can perform under relatively low pressure and low temperature. As a result, the hydrogenation reactor of the present invention operates with a reaction temperature of 30-90° C., preferably 50-80° C., a pressure of the hydrogen gas of 140-1000 lb/in$^2$, preferably 360-735 lb/in$^2$, and reaction time of 1-18 hours.

As shown in FIG. 2, to perform hydrogenation reaction, the liquid reactant 30 is placed into the hydrogenation reactor 40 disclosed in the present invention, while a proper amount of the catalyst is added and the hydrogen gas is introduced. Then the gas-distributing agitator 50 is started. While the hollow shaft 51 of the gas-distributing agitator 50 drives the blades 52 to rotate and stir the liquid reactant 30, the hydrogen gas above the liquid surface 31 of the liquid reactant 30 is drawn or introduced into the gas channel 53 inside the hollow shaft 51 through the gas inlets 54 formed on the hollow shaft 51, and then exhausted through the gas outlets 55 at the lower part of the hollow shaft 51.

As the blades 52 of the gas-distributing agitator 50 stirs the liquid reactant 30 inside the hydrogenation reactor 40, the exhausted hydrogen gas is evenly distributed over the liquid reactant 30, so as to not only improve contact between the hydrogen gas and the liquid reactant 30, but also allow the liquid reactant 30 to have a high level of dissolved hydrogen gas, which enhances activity of the hydrogenation catalyst and accelerates hydrogenation reaction.

At completion of hydrogenation reaction, the catalyst is filtered out and crude bisphenol-A-based epoxy resin is obtained as a composition containing 25-50 wt % hydrogenated bisphenol-A-based epoxy resin, 50-75 wt % solvent and a few impurities. Therein, the yield of the hydrogenated bisphenol-A-based epoxy resin is up to 99.0-99.9%.

According to the above description, the hydrogenation process for improving yield of hydrogenated bisphenol-A-based epoxy resin disclosed by the present invention comprises steps of:

a) providing a hydrogenation reactor 40, which interior is equipped with a gas-distributing agitator 50 which has a hollow shaft 51 thereof and blades 52 at a terminal of the hollow shaft 51 as well as has functions of introducing and exhausting hydrogen gas and stirring liquid reactant if started;

b) introducing a liquid reactant 30 containing bisphenol-A-based epoxy resin prepared in a solvent into the hydrogenation reactor 40;

c) adding a hydrogenation catalyst into the liquid reactant, wherein a use amount of the bisphenol-A-based epoxy resin ranges between 0.2 and 15 wt %;

d) introducing hydrogen gas having a pressure ranging between 140 and 1000 lb/in$^2$;

e) activating the gas-distributing agitator 50 rotated in a predetermined rotation rate to have the hydrogen gas drawn into the hollow shaft 51 of the gas-distributing agitator 50 through gas inlets 54 formed on the hollow shaft 51 and located above a liquid surface 31 of the liquid reactant 30, and further have the drawn hydrogen gas exhausted out through gas outlets 55 formed on the hollow shaft 51 and immersed in the liquid reactant 30; simultaneously the rotating blades 52 of the gas-distributing agitator 50 evenly distributing the exhausted hydrogen gas over the liquid reactant 30;

f) performing hydrogenation reaction at a reaction temperature ranging between 30 and 90° C. for a reaction time ranging between 1 and 18 hours, so that the bisphenol-A-based epoxy resin in the liquid reactant 30 is hydrogenated and form hydrogenated bisphenol-A-based epoxy resin; and g) at completion of the hydrogenation reaction, cooling the liquid reactant to the room temperature, filtering out the catalyst and removing the solvent to obtain the hydrogenated bisphenol-A-based epoxy resin.

Some examples will be described below for further illustrating the present invention without limiting the scope of the present invention.

Example 1

180 g bisphenol-A-based epoxy resin was weighted and dissolved in 180 g tetrahydrofuran, and placed into a pressure vessel of 0.5 liter with a gas-distributing agitator. 5.4 g rhodium catalyst was added and hydrogen gas was introduced until the pressure reached 590 lb/in$^2$ and maintained. Then the gas-distributing agitator of the vessel was activated to make the hollow shaft rotate in a speed of 1000 rpm. The vessel was heated to 80° C. for subsequent 3 hours of reaction. At the completion of the reaction, the liquid reactant was cooled to the room temperature, before the catalyst was filtered out and tetrahydrofuran was removed to obtain the product. The product was analyzed and the results are reflected in Table 1. The hydrogenated bisphenol-A-based epoxy resin was made with yield of 99.5%.

Example 2

This example is similar to Example 1 except that the pressure of the hydrogen gas was changed to 530 lb/in$^2$. The product was analyzed and the results are reflected in Table 1. The hydrogenated bisphenol-A-based epoxy resin was made with yield of 99.0%.

Example 3

This example is similar to Example 1 except that the pressure of the hydrogen gas was changed to 650 lb/in$^2$. The product was analyzed and the results are reflected in Table 1. The hydrogenated bisphenol-A-based epoxy resin was made with yield of 99.9%.

Example 4

This example is similar to Example 1 except that the pressure of the hydrogen gas was changed to 530 lb/in$^2$ and the reaction temperature was changed to 50° C. The product was analyzed and the results are reflected in Table 1. The hydrogenated bisphenol-A-based epoxy resin was made with yield of 92.0%.

Example 5

This example is similar to Example 1 except that the use amount of rhodium as the catalyst was changed to 0.36 g. The product was analyzed and the results are reflected in Table 1. The hydrogenated bisphenol-A-based epoxy resin was made with yield of 80.5%.

Comparative Example 1

This comparative example is similar to Example 1 except that a traditional vane stirrer incapable of extracting and exhausting gas and stirring was used instead of the gas-distributing agitator. The product was analyzed and the results are reflected in Table 1. The hydrogenated bisphenol-A-based epoxy resin was made with yield of 60.0%.

Comparative Example 2

This example is similar to Comparative Example 1 except that the pressure of the hydrogen gas was changed to 735 lb/in$^2$. The product was analyzed and the results are reflected in Table 1. The hydrogenated bisphenol-A-based epoxy resin was made with yield of 75.0%.

Comparative Example 3

This example is similar to Comparative Example 1 except that the pressure of the hydrogen gas was changed to 735 lb/in$^2$ and the use amount of rhodium as the catalyst was increased to 18 g. The product was analyzed and the results are reflected in Table 1. The hydrogenated bisphenol-A-based epoxy resin was made with yield of 78.0%.

Comparative Example 4

This example is similar to Comparative Example 1 except that the use amount of rhodium as the catalyst was decreased to 0.36 gram. The product was analyzed and the results are reflected in Table 1. The hydrogenated bisphenol-A-based epoxy resin was made with yield of 50.0%.

TABLE 1

Hydrogenation Reaction for Bisphenol-A-Based Epoxy Resin

| | Example | | | | | Comparative Example | | | |
| --- | --- | --- | --- | --- | --- | --- | --- | --- | --- |
| | 1 | 2 | 3 | 4 | 5 | 1 | 2 | 3 | 4 |
| Hydrogenation Reactor | Improved Reactor (where hydrogen gas is introduced by the hollow shaft) | | | | | Traditional Reactor | | | |
| Bisphenol-A-Based Epoxy Resin (g) | 180 | 180 | 180 | 180 | 180 | 180 | 180 | 180 | 180 |
| Tetrahydrofuran (g) | 180 | 180 | 180 | 180 | 180 | 180 | 180 | 180 | 180 |
| Rhodium Catalyst (g) | 5.4 | 5.4 | 5.4 | 5.4 | 0.36 | 5.4 | 5.4 | 18 | 0.36 |
| Hydrogen Gas Pressure (lb/in$^2$) | 590 | 530 | 650 | 530 | 590 | 590 | 735 | 735 | 590 |
| Reaction Temperature (° C.) | 80 | 80 | 80 | 50 | 80 | 80 | 80 | 80 | 80 |
| Reaction Time (Hr) | 3 | 3 | 3 | 3 | 3 | 3 | 3 | 3 | 3 |
| Yield of Hydrogenated Epoxy Resin (%) | 99.5 | 99.0 | 99.9 | 92 | 80.5 | 60 | 75 | 78 | 50 |

What is claimed is:

1. A hydrogenation process for improving yield of hydrogenated bisphenol-A-based epoxy resin, comprising steps of:
   a) providing a column-shaped hydrogenation reactor required to have a height/diameter ratio ranging between 0.4 and 3 for hydrogenating a liquid reactant placed therein and further comprise a heat exchange plate or a cooling coil for timely removing heat generated in the course of hydrogenation reaction and a gas-distributing agitator internally equipped in the reactor and comprising a hollow shaft thereof and blades at a terminal of the hollow shaft for introducing and exhausting hydrogen gas to the liquid reactant and simultaneously stirring the liquid reactant if started;

b) introducing a liquid reactant containing bisphenol-A-based epoxy resin prepared in a solvent into the hydrogenation reactor;

c) adding a hydrogenation catalyst selected one from ruthenium, palladium, platinum, rhodium or nickel in an amount ranging between 0.5 and 5 wt % by weight of the bisphenol-A-based epoxy resin into the liquid reactant of step b);

d) introducing hydrogen gas having a pressure ranging between 360 and 735 $lb/in^2$ into the hydrogenation reactor e) activating the gas-distributing agitator rotated in a predetermined rotation rate to have the hydrogen gas drawn into the hollow shaft of the gas-distributing agitator through gas inlets formed on the hollow shaft and located above a liquid surface of the liquid reactant, and further have the drawn hydrogen gas exhausted out through gas outlets formed on the hollow shaft and immersed in the liquid reactant, thereby the rotating blades of the gas-distributing agitator evenly distributing the exhausted hydrogen gas over the liquid reactant;

f) performing hydrogenation reaction at a reaction temperature ranging between 80 and 90° C. for a reaction time ranging between 1 and 18 hours; and g) at completion of the hydrogenation reaction, cooling the liquid reactant to the room temperature, filtering out the catalyst and removing the solvent to obtain hydrogenated bisphenol-A-based epoxy resins with a yield ranging between 99.0 and 99.9%.

2. The hydrogenation process of claim 1, wherein the solvent used at step b) is methylbenzene, methyl isobutyl ketone or tetrahydrofuran.

3. The hydrogenation process of claim 1, wherein the hydrogenation reaction is performed at the temperature of 80° C.

\* \* \* \* \*